United States Patent [19]

Krumme

[11] 4,151,922

[45] May 1, 1979

[54] SLAB COOLING DEVICE

[75] Inventor: Werner Krumme, Pittsburgh, Pa.

[73] Assignee: Wean United, Inc., Pittsburgh, Pa.

[21] Appl. No.: 777,296

[22] Filed: Mar. 14, 1977

[51] Int. Cl.² .................... B65G 47/90

[52] U.S. Cl. .................... 414/416; 134/76; 414/589; 266/132

[58] Field of Search .................... 214/8.5 C, 1 BB, 301, 214/671, 309, 1 B, 655, 654; 198/339, 485, 486; 212/10, 11, 14, 18, 20; 134/76, 133, 134; 72/201; 266/132

[56] References Cited

U.S. PATENT DOCUMENTS

| | | | |
|---|---|---|---|
| 3,680,344 | 8/1972 | Manthey et al. | 134/76 |
| 3,895,498 | 7/1975 | Manthey et al. | 214/658 X |
| 4,008,814 | 2/1977 | Kral et al. | 214/16 |
| 4,036,243 | 7/1977 | Manthey et al. | 134/76 |

*Primary Examiner*—Frank E. Werner

*Attorney, Agent, or Firm*—Daniel Patch; Suzanne Kikel

[57] ABSTRACT

A motorized carriage for depositing and removing heated metal articles such as cast or rolled slabs, into and from adjacent compartments of an enlongated cooling basin. The carriage consists of a movable carrier crossbeam which has several vertical downwardly extending rotatable spaced-apart fingers, each having two horizontal perpendicular extensions. Upon a 90° rotation the fingers release a hot slab and grasp a cooled slab.

1 Claim, 3 Drawing Figures

SLAB COOLING DEVICE

Hot metal articles such as slabs, issuing from a hot mill or caster are cooled evenly by immersion into a cooling water contained in a rectangular basin having a shelf-like frame forming compartments or bays to receive the slabs.

In the past a single carriage or, in other forms, two carriages supporting either a hot or cooled slab were motivated across the top of the basin from a slab entry station to a delivery station. Such arrangements are shown in U.S. Pat. Nos. 3,895,498 and 3,680,344. These arrangements have carriages with single or double pockets and slab holding and retaining means, which have the disadvantage of being very complicated in design and expensive to manufacture and operate.

An object, therefore, of the present invention is to provide for a simple and economical device for releasing and securing slabs in a cooling basin.

More particularly, an object of the present invention is to provide a series of cooperating slab carrying fingers each having two horizontal extensions arranged perpendicularly to each other which, when such extensions are beneath the level of a slab support platform of the basin and upon a 90° rotation of the fingers, one extension will release a hot slab into a compartment and the other extension will be arranged into a position beneath a cooled slab in an adjacent compartment to engage and lift this slab when the fingers are raised.

Another object of the present invention is to provide for a horizontal carrier crossbeam mounted to a carriage for movement therewith and for vertical movement relative thereto, which carrier crossbeam consists of a series of cooperating slab carrying fingers, means for rotatably mounting the fingers, and a pair of guide means for each finger arranged in alignment to each other spaced both longitudinally and transversely relative to an adjacent cooperative finger relative to a supported slab in which one of the pair of guide means forms an opening for holding and guiding a slab to be deposited and the other guide means forms an opening for receiving and guiding a slab to be removed from a basin.

Figure 1:
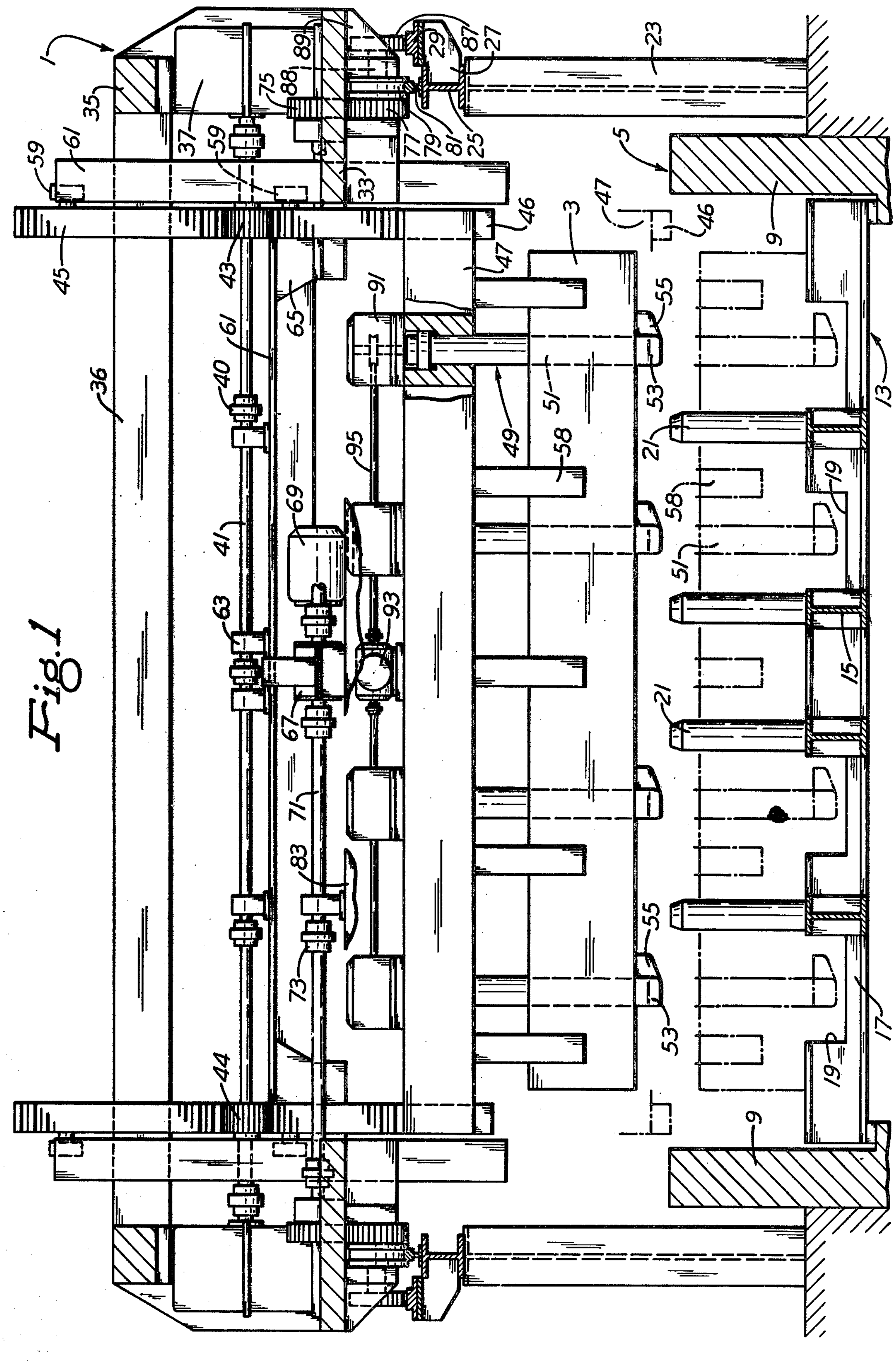
Figure 2:
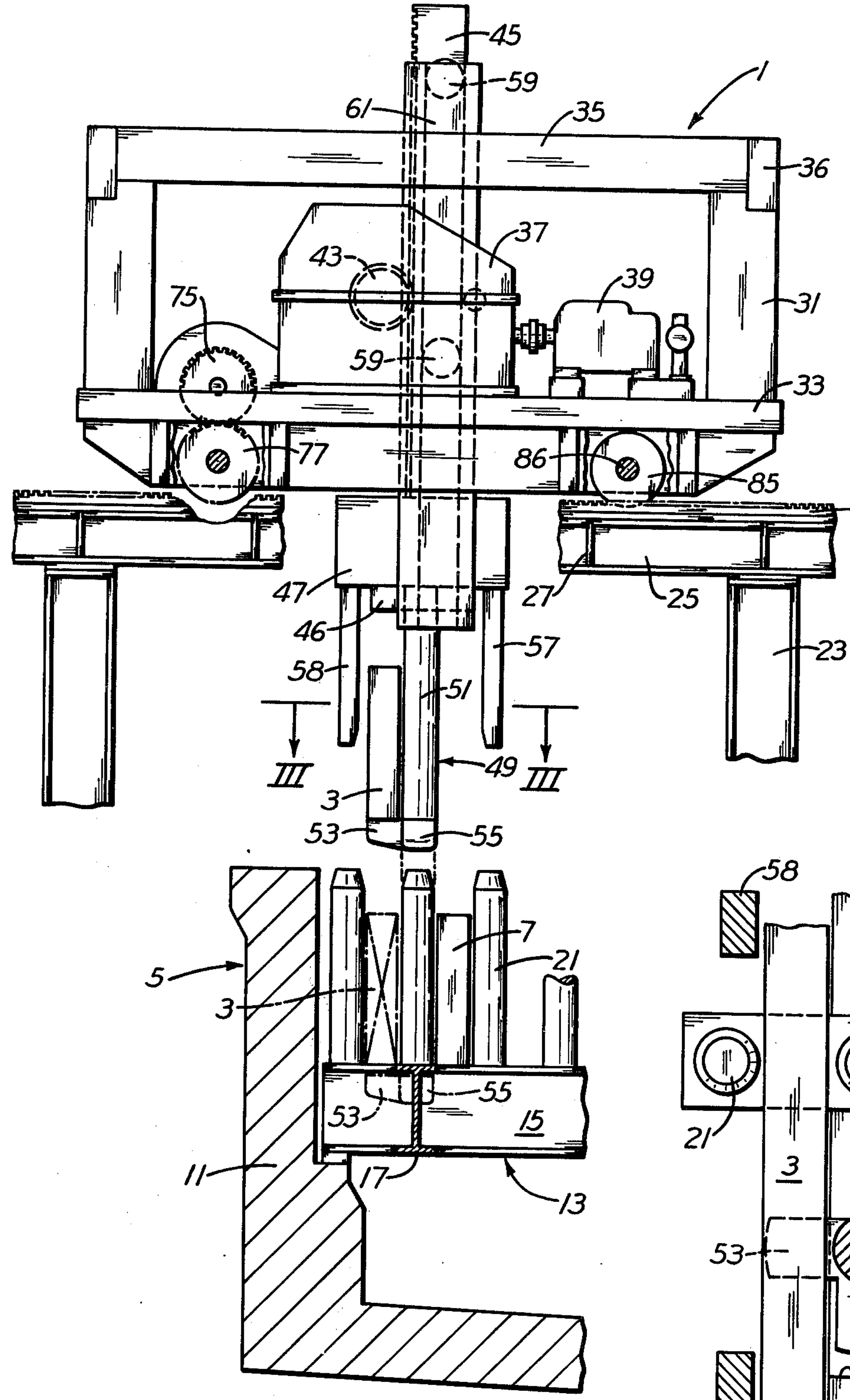

These objects, as well as other novel features and advantages of the present invention will be better understood and appreciated when the following description is read along with the accompanying drawings of which:

FIG. 1 is a transverse sectional view of a slab cooling device constructed in accordance with the present invention showing a hard line and a phantom line positioning of a carrier crossbeam, and other elements including the slab in a cooling basin. FIG. 2 is a longitudinal elevation front view of the device shown in FIG. 1, partly in section, and partly broken away for clarity; and also showing in phantom a hot slab deposited into the basin and an adjacent cooled slab in hard lines.

Figure 3:
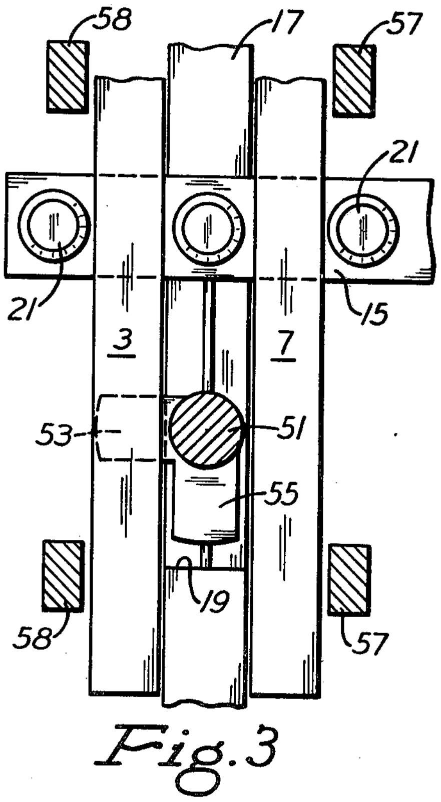

FIG. 3 is a sectional view taken along lines 3—3 of FIG. 2.

Referring first to FIGS. 1 and 2, there is shown a motorized slab cooling device consisting of a carriage 1 carrying a hot slab 3 and extending more than the width of a cooling basin 5 which, as shown, receives hot slab 3 while supporting cooled slab 7. FIG. 2 viewed as one looks in from the right hand side of FIG. 1.

It is to be understood that the entry device for a hot slab from a rolling mill or caster, and a delivery device for a cooled slab for further processing in a rolling mill operation can be similar to those shown in the aforesaid U.S. Pat. Nos. 3,895,498 and 3,680,344, and for these reasons are not illustrated. Basin 5 is a rectangular open top construction as defined by sidewalls 9, end walls 11 and platform 13. Platform 13 consists of a series of spaced-apart horizontal longitudinal I-beams 15 mounted in a series of spaced-apart transversed I-beams 17 in a crisscross manner. Cutout portions 19 in transverse beams 17 enable placement of the carriage 1 below the top of platform 13, more about which will be discussed shortly. Mounted to the longitudinal I-beams 15 for easy removal is a series of vertical prongs 21 defining several compartments of the cooling basin 5 to receive slabs which are vertically deposited between successive prongs and supported edgewise by the longitudinal I-beams 15.

Referring more particularly to FIG. 1, extending upright alongside the side walls 9 on either side of basin 5 is a vertical I-beam 23 for supporting carriage 1. Mounted on I-beam 23 is a horizontal I-beam 25 overextending the length of the basin. Secured to horizontal I-beam 25 is a series of spaced-apart brackets 27 (better shown in FIG. 2) for supporting a rack 29, and which, not shown, also overextends the length of the basin, more about which will be discussed shortly.

For a very stable and rigid structure, carriage 1 consists of: upright members 31, shown only in FIG. 2, supported on a solid horizontal plate 33 extending the width and partially extending the length of the carriage; top crossbeams 35 running parallel to horizontal I-beams 25; and top crossbeams 36 running the width of basin 5. The interconnection of these components creates a box-like configuration for carriage 1. In further describing the carriage, only the right hand side as one views FIG. 1 will be described, it being understood that the components of the left hand side are identical, as are the components of basin 5.

Mounted directly above I-beam 25 on plate 33 is gear drive 37 driven by motor 39 which is only shown in FIG. 2. Gear drive 37 through couplings 40 and tie shaft 41 drive pinion 43–44 meshing with rack 45 causing rack to be displaced vertically. As can be seen in FIG. 2, the lower part of rack 45 is machined in a T-configuration at 46 in order for a hollow carrier crossbeam 47 to be securely mounted to rack 45. Rotatably mounted aong the longitudinal centerline of carrier crossbeam 47, FIG. 1 shows a series of four finger assemblies 49, each vertical finger 51 having at least two horizontal extensions 53 and 55 arranged at a 90° angle relative to each other for supporting slab 3, which is the maximum length fingers 51 can support. As one views FIG. 1 mounted on either side of carrier crossbeam 47 along its longitudinal dimension and interspersed between bearing finger assemblies 49 are five vertical guides 58 for forming an opening to receive slab 3 supported by extensions 53 and five vertical guides 57 one of which is shown in FIG. 2 for forming an opening to receive slab 7 supported by extensions 55. These guides 57 are shorter than fingers 51 and are narrow enough so that when they are are mounted on beam 47 a clearance is created between the slab and guide so that a very simple, but effective accommodating slab-retaining arrangement is provided. The teeth of rack 45 extends a distance proportional to the requied distance for fingers 51 to be raised and lowered into basin 5 below the top of platform 13 whereby extensions 53 and 55 can be positioned into cutout portions 19 beneath a slab. Fingers 51 and extensions 53 and 55 can be a molded piece or separate pieces whereby the extensions are securely mounted in the fingers. The length of extensions 53 and 55 are substantially equal to an edgewise longitudinal dimension of a slab. To stabilize the raising and lowering of fingers 51 in carrier crossbeam 47 and to assure that the fingers and extensions 53 and 55 will descend and ascend vertically into and out of the basin, there are provided rollers 59 mounted to rack 45, which rollers are received in a U-shaped stationary guiding member 61 mounted in plate 33. As mentioned earlier, for synchronous movement of both sides of rack 45, there is provied tie shaft 41 connecting pinion 43 to pinion 44 by couplings 40. Tie shaft 41 is mounted to platform 61 by several bearing stands 63. Platform 61 is formed by being welded to a rigid member 65 mounted to plate 33. Rigid member 65 extends only a portion of the width of plate 33.

For longitudinal movement of carriage 1, gear drive 67 by motor 69 and through tie shaft 71 and couplings 73 synchronously drives gear 75 which meshes with gear 77 to drive front wheel 79 over rail 81 mounted on I-beam 25. Gear drive 67, motor 69, and bearing stands 73 are mounted to platform 83 formed by being welded to plate 33. Even though only two wheels 79 are shown in FIG. 1, an idler wheel 85 is mounted by stud axles 86 at the rear on either side of carriage 1 (shown only in FIG. 2). Pinions 87 mounted by a stud axle 88 to brackets 89 meshes with rack 29 to register carriage 1 above the desired compartment so that fingers 51 can be accurately and vertically aligned with vertical prongs 21.

Again referring to FIG. 1, several worm gear units 91 are mounted on carrier crossbeam 47 and connected to finger assemblies 49. These units 91 are synchronously driven in the same direction by a combination gear-motor unit 93 through tie shaft 95 to rotate each finger 51 in the same direction so that each series of extensions 53 can be positioned outwardly to the left along a vertical edge of hot slab 3 and each series of extensions 55 can be positioned outwardly to the right along a vertical edge of cooled slab 7 as one views FIG. 2.

FIG. 3 illustrates the positioning of one of the extensions 53 as slab 3 is deposited into a compartment while one of the extensions 55 remains between slabs 3 and 7 in cutout portion 19 of transverse I-beam 17. It also illustrates the location of guides 57 and 58 relative to the fingers 51 and extensions 53 and 55, which guides 57 and 58 are parallel to each other spaced both longitudinally and transversely along the carrier crossbeam 47, but are arranged diagonally to the fingers. Each of the guides 58 cooperate with a finger 51 to serve as a guide for slab 3 to be deposited, and each of the guides 57 cooperate with the same finger 51 to serve as a guide for slab 7 to be removed from the basin.

In describing the operation of the present invention, hot slab 3 received from an entry device (not shown) is to be deposited into a compartment and cooled slab 7 is to be removed from the adjacent compartment and taken to a delivery device (not shown). Carriage 1 is driven along I-beam 25 by motor 69 driving gear 75 meshing with gear 77 and, which, in turn rotates wheel 79 along rail 81. The operator of the slab cooling device registers carriage 1 by pinions 87 meshing with rack 29 above an empty compartment so that fingers 51 are vertically aligned with vertical prongs 21. Gear drive 37 and motor 39 is activated in a direction to rotate pinions 43–44 to lower rack 45 with carrier crossbeam 47 so that fingers 51 are now interspersed in a direct transverse alignment between vertical prongs 21, and extension 55 are received in cut-out portions 19 of transverse I-beams 17. The operator activates gear reduction unit 93 to rotate fingers 51 through a 90° angle whereby extensions 55 are pivoted into position beneath cooled slab 7 and the extensions 53 are removed from their contact with the hot slab 3 now supported by the beams 15. Motor 39 is reversed to raise fingers 51 supporting slab 7 out of basin 5 and carriage 1 is now moved to the slab delivery device of the basin.

In accordance with the provision of the patent statutes, I have explained the principle and operation of my invention and have illustrated and described what I consider to represent the best embodiment thereof.

I claim:

1. A slab cooling device having a motorized carriage for movement over the length of an elongated cooling basin capable of simultaneously depositing a first metal slab into and removing a second slab from the basin, comprising:

means in said basin for forming a series of adjacent compartments to receive slabs to be cooled, a horizontal member mounted to said carriage for vertical displacement relative to said carriage and said compartments, means for vertically displacing said horizontal member, including a gear rack means for engaging at least two gear pinions arranged in a spaced apart relationship with respect to each other and an equalizing shaft connecting said gear pinions, a number of vertically arranged means rotatably mounted at their upper ends in said horizontal member and extending toward said compartments, at least two horizontal extensions arranged at an angle mounted at the lower end of each said vertically arranged means, one extension for supporting said first slab and the other extension for supporting said second slab.

said extension constructed and arranged upon a selected rotation thereof to release said first slab into one of said compartments and to assume a supporting relationship with said second slab in an adjacent compartment, at least two vertical guide means for each vertically arranged means and including two pairs of spaced apart guides fixedly mounted at their upper ends in said horizontal member and extending in a direction parallel to said vertically arranged means and overlapping to an appreciable extent a slab supported by said horizontal extensions and yet leaving an appreciable space between the lower ends of said guides and said horizontal extensions, and wherein said pairs of guides and said vertically arranged means are constructed and arranged to always have a fixed relationship with respect to each other and with respect to each other being arranged in an alternating fashion longitudinally of said compartments, said pairs of guides being constructed to form two groups, the guides of each group being arranged in alignment with each other in a plane parallel to the supported slabs and spaced longitudinally relative to a plane containing the vertically arranged means and the groups being arranged transversely relative to said containing plane to form two openings for said first and second slabs, and means mounted on said horizontal member for synchronously rotating said vertically arranged means.

* * * * *